United States Patent [19]

Exner et al.

[11] Patent Number: 5,436,312
[45] Date of Patent: Jul. 25, 1995

[54] AQUEOUS FILLER COMPOSITION

[75] Inventors: Reiner Exner, Bad Duerkheim; Michael Schwab, Niederhausen-Oberjosbach; Ute Kuhn, Niedernhausen; Joachim Zoeller, Mainz, all of Germany

[73] Assignee: Hoechst Aktiengesellschaft, Germany

[21] Appl. No.: 306,813

[22] Filed: Sep. 15, 1994

Related U.S. Application Data

[63] Continuation of Ser. No. 992,594, Dec. 18, 1992, abandoned.

[30] Foreign Application Priority Data

Dec. 21, 1991 [DE] Germany .......... 41 42 730.0
Jul. 4, 1992 [DE] Germany .......... 42 22 012.2

[51] Int. Cl.$^6$ .......... C08G 63/00; C08G 63/02; C08G 63/68
[52] U.S. Cl. .......... 528/176; 528/193; 528/194; 528/272; 528/287; 528/293; 523/501
[58] Field of Search .......... 523/501; 528/176, 193, 528/194, 272, 287, 293

[56] References Cited

U.S. PATENT DOCUMENTS 4,910,292 3/1990 Blount .......... 528/272

Primary Examiner—Paul R. Michl
Assistant Examiner—La Vonda R. Dewat
Attorney, Agent, or Firm—Bierman and Muserlian

[57] ABSTRACT

Aqueous filler composition comprising a polyester resin, which is built up of the educts (a), (b), (c), (d) and (e) or their ester-forming derivatives, the sum of the reactants corresponding to 100 mol-% and the ratio of the sum of the hydroxyl equivalents (eg OH) to the sum of the carboxyl equivalents in the reactants being between 0.5 and 2.0, where

- (a) is at least one dicarboxylic acid which is not a sulfo or phosphorus monomer,
- (b) is 0 to 15 mol-% of at least one difunctional sulfo or phosphono monomer, the functional groups of which are carboxyl and/or hydroxyl groups, having at least one sulfonate or phosphonate group,
- (c) is at least one difunctional compound which is derived from a glycol containing two —C(R-)$_2$—OH groups,
- (d) is up to 40 mol-% of a higher functional compound (functionality >2), the functional groups of which comprise hydroxyl and/or carboxyl groups, and
- (e) is 0 to 20 mol-% of a monofunctional carboxylic acid, it being possible for the radicals R in (c) independently of one another to be hydrogen, $C_1$-$C_4$-alkyl or $C_6$-$C_{10}$-aryl, the amounts of free hydroxyl groups being between 30 and 350 milliequivalents OH/100 g, preferably between 100 and 250 meq (OH)/100 g, and the content of free neutralized and/or neutralizable acid groups, in particular sulfonic acid groups, phosphonic acid groups and carboxylic acid groups, being between 5 and 350 meq acid groups/100 g, preferably between 9 and 120 meq acid groups/100 g.

7 Claims, No Drawings

AQUEOUS FILLER COMPOSITION

This application is a continuation of U.S. patent application Serial No. 992,594 filed Dec. 18, 1992, now abandoned.

Filler compositions are applied in particular in the vehicle industry as a layer between primer and top coat and serve, on the one hand, to compensate for unevenness in the primer, by which means a flawless appearance of the top coat is to be ensured, and, on the other hand, to improve the protection of the entire paintwork against damage by flying stones. As a result of plastic properties, this layer is intended to prevent penetration by scattered chippings particles and the like, such as are thrown against the paintwork by other vehicles or also by the vehicle itself. On the other hand, the filler compositions must yield relatively hard films in order to make wet grindability of the paintwork possible, without the abrasive paper becoming clogged.

Environmentally friendly water-based filler compositions (so-called "water-based fillers" or "hydrofillers") which comprise, as binder, a mixture of carboxyl-functional, water-dilutable polyester resin, water-soluble epoxy resin phosphoric (phosphonic) acid ester and a melamine resin, are described in EP-A 249 727. The processibility and the spectrum of properties of these filler compositions and of the films obtainable therefrom are very good overall but, inter alia, the resistance to flying stones, especially at relatively low temperatures (<0° C.), and the adhesion of the intermediate layer, especially to the top coat, are not satisfactory in all cases.

It has now been found that aqueous filler compositions based on specific water-dispersible polyester resins do not have these disadvantages. Some polyesters of this type have already been disclosed in EP 0 364 331. This document describes the intended use of these polyesters quite generally as the production of coatings, in particular paint coatings. Specific use as binders for fillers is not mentioned in this publication. Fillers must have a high adhesion of the intermediate layer and, at the same time, a high resistance to flying stones. It is surprising and cannot easily be deduced from the said document that the polyesters described in said document have this particular spectrum of characteristics and, thus, are very suitable as binders in aqueous filler compositions.

The invention therefore relates to an aqueous filler composition comprising a polyester resin, which is built up of the educts (a), (b), (c), (d) and (e) or their ester-forming derivatives, the sum of the reactants corresponding to 100 mol-% and the ratio of the sum of the hydroxyl equivalents (eq OH) to the sum of the carboxyl equivalents in the reactants being between 0.5 and 2.0, where (a) is at least one dicarboxylic acid which is not a sulfo or phosphorus monomer, (b) is 0 to 15 mol-% of at least one difunctional sulfo or phosphono monomer, the functional groups of which are carboxyl and/or hydroxyl groups, having at least one sulfonate or phosphonate group, (c) is at least one difunctional compound which is derived from a glycol containing two —C(R-)$_2$—OH groups, (d) is up to 40 mol-% of a higher functional compound (functionality >2), the functional groups of which comprise hydroxyl and/or carboxyl groups, and (e) is 0 to 20, preferably up to 10, mol-% of a monofunctional carboxylic acid, it being possible for the radicals R in (c) independently of one another to be hydrogen, $C_1$–$C_4$-alkyl or $C_6$–$C_{10}$-aryl, the amounts of free hydroxyl groups being between 30 and 350 milliequivalents OH/100 g, preferably between 100 and 250 meq (OH)/100 g, and the content of free neutralized and/or neutralizable acid groups, in particular sulfonic acid groups, phosphonic acid groups and carboxylic acid groups, being between 5 and 350 meq acid groups/100 g, preferably between 9 and 120 meq acid groups/100 g. The mol-% data in each case relate to the total amount of all monomers.

Preferred alkyl groups are methyl, ethyl, n-propyl, isopropyl, n-butyl and isobutyl and preferred aryl groups are phenyl and naphthyl. The terms higher functional, multifunctional or polyfunctional used here designate compounds which have more than two reactive hydroxyl and/or carboxyl groups, the term glycol signifies a compound which has two hydroxyl substituents and the term polyol signifies a compound which has more than two hydroxyl substituents.

The dicarboxylic acid component (a) of the polyester comprises aromatic or cycloaliphatic alkyldicarboxylic or alkylenedicarboxylic acids as well as dimer fatty acids or comprises mixtures of two or more of these dicarboxylic acids. Examples of these dicarboxylic acids are oxalic acid, malonic acid, glutaric acid, adipic acid, pimelic acid, azelaic acid, sebacic acid, fumaric acid, maleic acid and itaconic acid, 1,3-cyclopentanedicarboxylic acid, 1,2-cyclohexanedicarboxylic acid, 1,3-cyclohexanedicarboxylic acid, 1,4-cyclohexanedicarboxylic acid, phthalic acid, terephthalic acid, isophthalic acid, 2,5-norbornanedicarboxylic acid, 1,4-naphthalenedicarboxylic acid, diphenyldicarboxylic acid, 4,4'-sulfonyldibenzoic acid and 2,5-naphthalenedicarboxylic acid as well as their esters or their anhydrides.

Preferred dicarboxylic acid components (a) are phthalic acid, isophthalic acid and terephthalic acid, phthalic acid anhydride, adipic acid, succinic acid, succinic anhydride, dimer fatty acids, sebacic and azelaic acid, 1,3-cyclohexanedicarboxylic acid and glutaric acid as well as their esters.

Component (b) of the polyesters to be described comprises a difunctional, aromatic, cycloaliphatic or aliphatic compound which has reactive carboxyl and/or hydroxyl groups and which also has a -$SO_3X$- or -$P(O)(OX)_2$- group, where X can be hydrogen or a metal ion such as, for example, $Na^+$, $Li^+$, $K^+$, $Mg^{2+}$, $Ca^{2+}$ or $Cu^{2+}$, or a nitrogen-containing cation derived from aliphatic, cycloaliphatic or aromatic compounds, such as, for example, ammonia, triethylamine, dimethylethanolamine, diethanolamine, triethanolamine or pyridine.

The -$SO_3X$- or -$P(O)(OX)_2$- groups can be bonded to an aromatic nucleus, such as, for example, phenyl, naphthyl, diphenyl, methylenediphenyl or anthracenyl. Examples of component (b) are sulfoisophthalic acid, sulfoterephthalic acid, sulfophthalic acid, sulfosalicylic acid, sulfosuccinic acid and their esters. The Na salts of sulfoisophthalic acid, dimethyl sulfoisophthalate, sulfosalicylic acid and sulfosuccinic acid are particularly preferred.

The proportion of component (b) is 0 to 15 mol-%, particularly preferentially 1 to 6 mol-% and in particular 1 to 4 mol-%.

The glycol component (c) can comprise low molecular weight aliphatic, cycloaliphatic or aromatic glycols, polyhydroxypolyethers or polycarbonate polyols. The following may be mentioned as examples of low molecular weight glycols: ethylene glycol, 1,2-propanediol, 1,3propanediol, 2,2-dimethyl-1,3-propanediol, 1,3-butanediol, 1,4-butanediol, 1,5-pentanediol, 1,6-hexanediol, 2,2,4-trimethyl-1,6-hexanediol, 1,2-cyclohexanedimethanol, 1,3-cyclohexanedimethanol, 1,4-cyclohexanedimethanol, perhydro-bisphenol A, p-xylylenediol, 2-ethylpropanediol and 2-butylpropanediol.

Suitable polyhydroxy-polyethers are compounds of the formula

H-[—O—(CHR)$_n$-]$_m$OH in which

R is hydrogen or a lower alkyl radical, which optionally has various substituents, n is a number from 2 to 6 and m is a number from 10 to 120

Examples are poly(oxytetramethylene) glycols, poly(oxyethylene) glycols and poly(oxypropylene) glycols. The preferred polyhydroxy-polyethers are poly(oxypropylene) glycols having a molecular weight in the range from 400 to 5000.

The polycarbonate-polyols or polycarbonate-diols are compounds which have the general formula

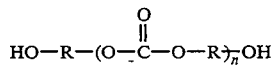

$$HO-R-(O-\overset{O}{\underset{\|}{C}}-O-R)_{\overline{n}}OH$$

in which R is an alkylene radical. These OH-functional polycarbonates can be prepared by reaction of polyols, such as propane-1,3-diol, butane-1,4-diol, hexane-1,6diol, diethylene glycol, triethylene glycol, 1,4-bishydroxymethylcyclohexane, 2,2-bis(4-hydroxycyclohexyl)-propane, neopentyl glycol, trimethylolpropane or pentaerythritol, with dicarbonates, such as dimethyl carbonate, diethyl carbonate or diphenyl carbonate, or phosgene. Mixtures of such polyols can also be used. Preferred higher functional components (d), which preferably contain 3 to 6 hydroxyl and/or carboxyl groups, are trimethylolpropane, trimethylolethane, glycerol, ditrimethylolpropane, pentaerythritol, dipentaerythritol, bishydroxyalkanecarboxylicacids, such as dimethylolpropionic acid and trimellitic acid anhydride, and also polyanhydrides as described in DE 28 11 913 or mixtures of two or more of these compounds, the proportion of the higher functional component (d) preferably being 5 to 30 mol-%, in particular 8 to 20 mol-%.

The monofunctional carboxylic acids (e) are predominantly fatty acids, such as capric acid, lauric acid, stearic acid and palmitic acid; however, branched carboxylic acids, such as isovaleric acid, and isooctanoic acid can also be used.

The number-average of the molecular weight of the polyester resin, determined experimentally with the aid of gel permeation chromatography, can be between 500 and 5000; 1000 to 3500 is preferred.

In order, if appropriate, to achieve as quantitative as possible a cocondensation of the sulfo or phosphonato monomers, it can be necessary to carry out the synthesis of the described polyesters in a multistep process. To this end, the entire hydroxy functional components are first reacted with the sulfo or phosphonato monomers and optionally with carboxylic acid-containing components in the presence of catalysts, so that 95% of the amount of distillate calculated for a quantitative conversion is obtained from the condensation reaction. If appropriate, the aliphatic carboxylic acid components are then reacted, the condensation reaction being continued until the desired content of carboxylic acid equivalents is obtained.

When using a bishydroxyalkanecarboxylic acid, an OH-functional polyester is first prepared, which is then subjected to a condensation reaction with the bishydroxyalkanecarboxylic acid and a further dicarboxylic acid to give the desired polyester.

If polycarboxylic acid anhydrides are used to introduce the anionic groups, an OH-functional polyester is reacted with the anhydride to give the half-ester and the condensation reaction is then continued until the desired acid number is obtained.

The reaction takes place at temperatures of between 140° C. and 240° C., preferably between 160° C. and 220° C. In order to prevent glycol losses, the distillation of the condensate is carried out via a distillation column. Suitable catalysts are, preferably, organometallic compounds, in particular zinc-, tin- or titanium-containing compounds, such as, for example, zinc acetate, dibutyltin oxide or tetrabutyl titanate. The amount of catalyst is preferably 0.05 to 1.5% by weight of the amount of the total batch.

The acid groups can already be introduced into the polyester in neutralized form via the individual components; if free acid groups are present in the polyester, they can be neutralized, if appropriate, using aqueous solutions of alkali metal hydroxides or using amines, for example using trimethylamine, triethylamine, dimethylaniline, diethylaniline, triphenylamine, dimethylethanolamine, aminomethylpropanol or dimethylisopropanolamine, or using ammonia.

The polyester can be isolated in bulk, but the preparation of a 50 to 95% strength solution in a water-miscible organic solvent is preferred. Suitable solvents for this purpose are, preferably, oxygen-containing solvents, such as alcohols, ketones, esters and ethers, for example: ethanol, n-propanol, iso-propanol, iso-butanol, butyl acetate and butyl glycol, or nitrogen-containing solvents, such as, for example, N-methylpyrrolidone. The viscosity of these solutions at 60° C. is preferably between 0.5 and 40 Pa.sec. This solution is then used for the preparation of the polyester dispersion, so that proportions of 15 to 65% by weight of polyester, of 0 to 30% by weight of organic solvents and of 35 to 85% by weight of water are present in the dispersions. The resulting pH value is 2 to 8.5, preferably 4 to 8.

Examples

The polyester synthesis is carried out in a 4 l four-necked round-bottomed flask surmounted by a packed column (column tube: 30 mm in diameter, 2000 mm long; packing: glass rings 6 mm in diameter and 6 mm long) and a descending distillation bridge, using a temperature probe for the reaction batch under a blanketing gas atmosphere (blanketing gas supply: nitrogen). If low-boiling alcohols, in particular methanol, are distilled off as condensate, the receiver must be cooled in an ice bath. The abbreviations used below are explained on page 14.

Polyester 1

Sample weights according to Table 1

Step 1: Melt hydroxyl group-containing reactants, add Na-5-DMSIP and 3.0 g of $Zn(Ac)_2$, heat, so that the top temperature does not exceed 65° C., and carry out the condensation reaction at about 190° C. until 22 g of distillate have been obtained.

Step 2: Cool to 140° C., add ADPA and heat, so that the top temperature does not exceed 100 ° C., and carry out the condensation reaction at temperatures of up to about 190° C. until 130 g of distillate have been obtained.

Step 3: Cool to 130° C., add TPA and 1.3 g of dibutyltin oxide, heat, so that the top temperature does not exceed 100 ° C., carry out the condensation reaction at 180° C. to 195° C. until a free carboxyl group content of 35 meq (COOH)/100 g has been obtained and then continue the condensation reaction at 200° C. and 150 mbar until a value of 9 meq (COOH)/100 g is obtained.

Polyester 2

Sample weights according to Table 1

Step 1: Melt hydroxyl group-containing reactants, add Na-5-DMSIP and 3.0 g of zinc acetate, heat, so that the top temperature does not exceed 65° C., and carry out the condensation reaction at 170° C. to 185° C. until 23 g of distillate are obtained.

Step 2: Cool to 140° C., add TPA and 1.5 g of dibutyltin oxide, heat, so that the top temperature does not exceed 100 ° C., and carry out the condensation reaction at temperatures of up to 210° C. until a free carboxyl group content of 45 meq (COOH)/100 g is obtained.

Step 3: Cool to 130° C., add ADPA, heat, so that the top temperature does not exceed 100 ° C., carry out the condensation reaction at 160 to 190° C. until a value of 35 meq (COOH)/100 g is obtained and then continue the condensation reaction at 200° C. and 100 mbar until a value of 7 meq (COOH)/100 g is obtained.

Polyester 3

Sample weights according to Table 1

Step 1: Melt hydroxyl group-containing reactants, add Na-5-SIP and 1.5 g of dibutyltin oxide, so that the top temperature does not exceed 100 ° C., and carry out the condensation reaction at 185° C. to 195° C. until 135 g of distillate are obtained.

Step 2: Cool to 120° C., add IPA and 1.0 g of dibutyltin oxide, heat, so that the top temperature does not exceed 100 ° C., and carry out the condensation reaction at temperatures of up to 190° C. until a free carboxyl group content of 45 meq (COOH)/100 g is obtained.

Step 3: Cool to 140° C., add ADPA, heat, so that the top temperature does not exceed 100 ° C., carry out the condensation reaction at 160 to 175° C. until a content of 55 meq (COOH)/100 g is obtained and then continue the condensation reaction at 180° C. to 200° C. and 100 mbar until a value of 12 meq (COOH)/100 g is obtained.

Polyester 4

Sample weights according to Table 1

Step 1: Melt neopentyl glycol and trimethylolpropane, add TPA, IPA and 2.5 g of dibutyltin oxide, heat, so that the top temperature does not exceed 100 ° C., and carry out the condensation reaction at 190° C. to 200° C. until an acid group content of 10 meq (COOH)/100 g is obtained.

Step 2: Cool to 140° C., add ADPA and DMPA, heat, so that the top temperature does not exceed 100 ° C., and carry out the condensation reaction at temperatures of up to 200° C. until a value of 55 meq (COOH)/100 g is obtained. Then cool to 80° C. and add 130.0 g of dimethylethanolamine.

Polyester 5

Sample weights according to Table 1

Step 1: Melt neopentyl glycol and trimethylolpropane, add TPA, IPA, LA and 2.5 g of dibutyltin oxide, heat, so that the top temperature does not exceed 100 ° C., and carry out the condensation reaction at 190° C. to 200° C. until an acid group content of 10 meq (COOH)/100 g is obtained.

Step 2: Cool to 140° C., add ADPA and DMPA, heat, so that the top temperature does not exceed 100 ° C., and carry out the condensation reaction at temperatures of up to 200° C. until a value of 55 meq (COOH)/100 g of obtained. Then cool to 80° C. and add 130.0 g of dimethylethanolamine. Add 300 g of butyl glycol and 70 g of dimethylethanolamine.

Polyester 6

Sample weights according to Table 1

Step 1: Melt neopentyl glycol and trimethylolpropane, add TPA, IPA and 2.5 g of dibutyltin oxide, heat, so that the top temperature does not exceed 100 ° C., and carry out the condensation reaction at 190° C. to 200° C. until an acid group content of 10 meq (COOH)/100 g is obtained.

Step 2: Cool to 140° C., add TMAA and stir at temperature until a value of 55 meq (COOH)/100 g is obtained. Then cool to 80° C. and add 523 g of butyl glycol and 192.3 g of dimethylethanolamine.

TABLE 1

| | | Polyesters Components | | | | | | | | | | |
|---|---|---|---|---|---|---|---|---|---|---|---|---|
| | | IPA | TPA | ADPA | Na-5-SIP | Na-DM-5-SIP | DMPA | NPG | HD | TMP | LA | TMAA |
| Polyester 1 | Sample wt. (g) | / | 850 | 890 | / | 135 | / | 1090 | / | 306 | / | / |
| | mol | / | 5.12 | 6.09 | / | 0.46 | / | 10.46 | / | 2.28 | / | / |
| | mol % | / | 21.0 | 24.9 | / | 1.9 | / | 42.8 | / | 9.3 | / | / |
| Polyester 2 | Sample wt. (g) | 955 | / | 800 | 110 | / | / | 1075 | / | 320 | / | / |
| | mol | 5.75 | / | 5.47 | 0.41 | / | / | 10.32 | / | 2.38 | / | / |
| | mol % | 23.6 | / | 22.5 | 1.7 | / | / | 42.4 | / | 9.8 | / | / |
| Polyester 3 | Sample wt. (g) | 450 | 505 | 800 | 118 | / | / | 800 | 310 | 320 | / | / |
| | mol | 2.71 | 3.04 | 5.47 | 0.44 | / | / | 7.68 | 2.62 | 2.38 | / | / |
| | mol % | 11.1 | 12.5 | 22.5 | 1.8 | / | / | 31.5 | 10.8 | 9.8 | / | / |

TABLE 1-continued

| | | | | | | | | | | | | | |
|---|---|---|---|---|---|---|---|---|---|---|---|---|---|
| Polyester 4 | Sample wt. (g) | 520 | 720 | 800 | / | / | 300 | 1040 | / | 400 | / | / | |
| | mol | 3.13 | 4.33 | 5.47 | / | / | 2.24 | 9.98 | / | 2.98 | / | / | |
| | mol % | 11.1 | 15.4 | 19.4 | / | / | 8.0 | 35.5 | / | 10.6 | / | / | |
| Polyester 5 | Sample wt. (g) | 260 | 300 | 450 | / | / | 150 | 520 | / | 220 | 100 | / | |
| | mol | 1.56 | 1.81 | 3.08 | / | / | 1.12 | 4.99 | / | 1.64 | 0.5 | / | |
| | mol % | 10.6 | 12.3 | 20.9 | / | / | 7.6 | 33.9 | / | 11.2 | 3.4 | / | |
| Polyester 6 | Sample wt. (g) | 980 | / | 619 | / | / | / | 657 | / | 375 | / | 332 | |
| | mol | 6.64 | / | 4.24 | / | / | / | 6.32 | / | 2.8 | / | 1.73 | |
| | mol % | 30.6 | / | 19.5 | / | / | / | 29.1 | / | 12.9 | / | 7.9 | |

| | OH/COOH ratio with respect to starting components | meq (COOH)/100 g | meq (OH)/100 g | meq (SO$_3$Na)/100 g |
|---|---|---|---|---|
| Polyester 1: | 1.191 | 9 | 145 | 16 |
| Polyester 2: | 1.195 | 7 | 140 | 14 |
| Polyester 3: | 1.190 | 12 | 146 | 15 |
| Polyester 4: | 1.188 | 55 | 203 | / |
| Polyester 5: | 1.181 | 56 | 156 | / |
| Polyester 6: | 0.78 | 104 | 117 | / |

Abbreviations:
PAA = phthalic acid anhydride
IPA = isophthalic acid
TPA = terephthalic acid
ADPA = adipic acid
Na-5-SIP = Na salt of 5-sulfoisophthalic acid
Na-DM-5-SIP = Na salt of dimethyl 5-sulfo isophthalate
HD = 1,6-hexanediol
NPG = neopentyl glycol
TMP = trimethylolpropane
DMPA = dimethylolpropionic acid
TMAA = trimellitic acid anhydride
LA = lauric acid The polyester resins are diluted at 90°–100° C. with butyl glycol to give an 85% strength solution. The corresponding aqueous polyester dispersions are obtained by further dilution (dispersion) of the polyesters dissolved in the organic solvent and temperature-controlled at 70° to 110° C. with demineralized water, temperature-controlled at 60° C., under increased shear rate (stirrer rotational speed of 3 to 6 m/sec).

The dispersions under Examples 1–6 are obtained by this process and have the following characteristics:

Example 1: 45% polyester 1, 8% butyl glycol, 47% water, pH=4.90, n=380 mPas

Example 2: 37.5% polyester 2, 6.5% butyl glycol, 56% water, pH=5.15, n=905 mPas

Example 3: 37.5% polyester 3, 6.5% butyl glycol, 56% water, pH=4.00, n=800 mPas

Example 4: 35.8% polyester 4, 6.2% butyl glycol, 58% water, pH=7.4, n=890 mPas

Example 5: 41% polyester 5, 6% butyl glycol, 53% water, pH=7.3, n=2671 mPas

Example 6: 41% polyester 6, 6.5% butyl glycol, 52.5% water, pH=6.4, n=65 mPas

The storage stability of the dispersions is more than 4 months at 25° C.

The aqueous filler composition claimed comprises, with respect to the total formulation, in general 5 to 40 and preferably 15 to 30% by weight of polyester resin.

In addition to the polyester resin, the aqueous filler composition can also contain, as binder, up to 60, and preferably up to 30,% by weight, with respect to the polyester resin, of other oligomer or polymer materials, such as crosslinkable, water-soluble or water-dispersible phenolic resins, polyurethane resins, epoxy resins or acrylic resins and the like, as, for example, described in European Published Specification 89 497.

As suitable crosslinking agents are the curing agents customary for polyol resins, insofar as they are compatible with water. The following may be mentioned here by way of example: water-compatible (water-soluble or water-dispersible) amino resins, in particular commercially available etherified melamine-formaldehyde condensation products, such as hexamethoxymethylmelamine, phenolic resins or blocked polyisocyanates, such as, for example, are described in German Published Specification 36 44 372.

The amount of crosslinking agent is usually 10 to 35% by weight, preferably 15 to 25% by weight, with respect to the sum of binder to be crosslinked and crosslinking agent.

The aqueous filler composition according to the invention, the pH of which can be so adjusted by adding amines, such as, for example, triethylamine, diethanolamine, diethanolamine and triethanolamine, that it is in the range from 6.0 to 10.0, preferably from 6.8 to 8.5, can also comprise the conventional coating composition additives, such as pigments and fillers, as well as coating auxiliaries, for example anti-settling agents, antifoams and/or wetting. agents, flow agents, reactive diluents, plasticisers, catalysts, auxiliary solvents, thickeners and the like. At least some of these additives can be added to the filler composition only immediately prior to processing. The selection and the dosage of these substances, which can be added to the individual components and/or the total mixture, are known to those skilled in the art.

Pigments which may be mentioned are, for example, iron oxides, lead oxides, lead silicates, titanium dioxide, barium sulfate, zinc oxide, zinc sulfide, phthalocyanine complexes and the like, and fillers which may be mentioned are mica, kaolin, chalk, ground quartz, ground asbestos, ground slate, diverse silicas, silicates and also talc, including so-called microtalc, with a particle fineness of at most 10 μm (cf. European Published Specification 249 727). These pigments and/or fillers are customarily used in amounts of 10 to 70, preferably of 30 to 50% by weight, with respect to the total solids content of the filler composition.

Further auxiliary solvents, for example ethers, such as dimethyl or diethyl glycol, dimethyl or diethyl diglycol and tetrahydrofuran, ketones, such as methyl ethyl ketone, acetone and cyclohexanone, esters, such as butyl acetate, ethyl glycol acetate, methyl glycol acetate and methoxypropyl acetate, and alcohols, such as ethanol, propanol and butanol, are, for reasons of environmental friendliness, used, if at all, only in amounts which are as small as possible and which as a rule do not exceed 10, preferably 1 to 5,% by weight, with respect to water (as the main diluent). The amount of water in the aqueous filler composition is usually 15 to 80% by weight, preferably 30 to 60% by weight, with respect to the total filler composition.

The aqueous filler composition is prepared by the customary methods for coating preparation, such as, for example, can be seen from the guide formulation given further below.

The aqueous filler compositions, which are infinitely dilutable with water and the solids content of which (at 125° C./2 hours) is generally 35 to 75, preferably 40 to 60,% by weight, are applied in a known manner, for example by spraying in accordance with the compressed air process or by means of airless or electrostatic spraying processes. In general temperatures of 120 to 200° C., preferably 150° to 170° C., are used for curing the filler layers applied. The curing time is generally 15 to 30 minutes, preferably 18 to 20 minutes.

The crosslinked filler coatings thus obtained are distinguished, in particular, by improved resistance to flying stones at relatively low temperatures (0° to −30° C.) as well as by good adhesion of the intermediate layer. In addition, they have good elongation at break and excellent impact strength. The resistance to atmospheric humidity and solvents is also very good.

Guide formulation for the filler formulation 65.0 parts of binder from Examples 1–3 were dispersed with 5.4 parts of a commercially available melamine-formaldehyde condensation product, 13.5 parts of titanium dioxide, 11.4 parts of barium sulfate (Blanc fix micro), 0.3 part of 25% strength aqueous dimethylethylethanolamine solution, 2.0 parts of talc, 0.1 part of carbon black, 1.5 parts of deionized water and 0.8 part of the customary coating auxiliaries in a bead mill (20 min, 600 rpm).

The filler composition is applied by means of a pressure blade gun onto zinc phosphated sheet steel coated (about 30 μm) with a cathodically deposited electrodip primer. The filler was cured in a circulating air oven for 10 min at 80° C. and then for 20 min at 160° C. (dry film thickness 35+2 μm). A commercially available alkyd-melamine car paint was applied to the filler layer and stoved for 30 min at 130° C. (dry film thickness about 30+5 μm).

The test results are summarized in Table 2 below. The resistance properties of the films (resistance to solvents and resistance to water) meet the requirements in practice.

TABLE 2

| Dispersion according to Example | 1 | 2 | 3 | 4 | 5 | 6 |
|---|---|---|---|---|---|---|
| Top coat condition | 2 | 2 | 2 | 2 | 1-2 | 1-2 |
| Top coat adhesion | | | | | | |
| +20° C. | 2 | 2-3 | 2 | 2-3 | 2-3 | 3-4 |
| −20° C. | 2 | 2-3 | 2 | 2-3 | | |
| Penetrations | | | | | | |
| +20° C. | 1 | 2 | 1-2 | 1-2 | 1-2 | 3 |
| −20° C. | 1 | 2 | 1 | 2 | | |
| Cross-hatch | Gt 0 | Gt 0 | Gt 0 | Gt 0 | Gt 0 | Gt 0 |

TABLE 2-continued

| Dispersion according to Example | 1 | 2 | 3 | 4 | 5 | 6 |
|---|---|---|---|---|---|---|
| (according to DIN 53151) Erichsen deep drawing (according to DIN 53156) | 9.0 | 7.9 | 8.2 | 8.0 | 9.0 | 7.5 |

Top coat condition

The gloss and surface of the top coat on the diverse filler materials were assessed subjectively in accordance with a rating scale (1=very good, 5=very poor).

Resistance to flying stones

Was tested using the VDA flying stone test apparatus (Erichsen, Model 508). For the present test in each case 1 kg of steel scrap (angular, 4–5 mm) was shot, accelerated by compressed air (2 bar), onto the test metal sheets. The top coat adhesion (0=no chipping of the filler, 10=complete loss of adhesion) and the penetrations through to the sheet metal (0=no penetration, 10 = very large number of penetrations) were assessed, with the aid of specimen metal sheets.

We claim:

1. An aqueous filler composition comprising a water-soluble polyester resin, which is built up of the educts (a), (b), (c), (d) and (e) or their ester-forming derivatives, the sum of the reactants corresponding to 100 mol-% and the ratio of the sum of the hydroxyl equivalents to the sum of the carboxyl equivalents in the reactants being between 0.5 and 2.0, where (a) is at least one dicarboxylic acid which is not a sulfonic or phosphonic monomer,
   (b) is 0 to 15 mol-% of at least one monomer bearing at least one sulfonic or phosphonic acid group in the form of the free acid or in the neutralized form and two functional groups selected from the group consisting of carboxyl and hydroxyl groups,
   (c) is at least ond disfunctional compound which is derived from a glyco containing two —C(R-)$_2$—OH groups,
   (d) is up to 40 mol-% of at least one member of the group consisting of trimethylolpropane, trimethylolethane, glycerol, ditrimethylolpropane, pentaerythritol, dipentaerythriol and bishydroxyalkane carboxylic acids, and
   (e) is 3.4 to 20 mol-% of a monofunctional carboxylic acid, the radicals R in (c) are independently hydrogen, $C_1$-$C_4$-alkyl or $C_6$-$C_{10}$-aryl, the amount of free hydroxy groups being between 30 and 350 mmol of OH per 100 g and the content of free neutralized and are neutralizable acid groups being between 5 and 350 meq of acid groups per 100 g.

2. The aqueous filler composition as claimed in claim 1, comprising a polyester resin which is prepared from (a) aliphatic, aromatic or cycloaliphatic dicarboxylic acids,
   (b) hydroxy- or carboxy-arylsulfonic acids or their salts,
   (c) aliphatic, aromatic or cycloaliphatic glycols, and
   (d) at least one member of the group consisting of trimethylolpropane, trimethylolethane, glycerol, ditrimethylolpropane, pentaerythritol, dipentaerythritol and bishydroxyalkanecarboxylic acids.

3. The aqueous filler composition as claimed in claim 1, comprising a polyester resin which is prepared from
(a) at least one member of the group consisting of phthalic acid, isophthalic acid and terephthalic acid, phthalic acid anhydride, adipic acid, sebacic acid, azelaic acid, 1,3-cyclohexanedicarboxylic acid and glutaric acid and their esters,
(b) at least one member of the group consisting of sulfoisophthalic acid, sulfoterephthalic acid, sulfophthalic acid, sulfosalicylic acid, their esters and their salts,
(c) at least one member of the group consisting of ethylene glycol, 1,2-propanediol, 1,4-butanediol, 1,6-hexanediol and perhydro-bisphenol A, and
(d) at least one member of the group consisting of trimethylolpropane, trimethylolethane, glycerol, ditrimethylolprgpane, pentaerythritol, dipentaerythritol and dimethylolpropionic acid.

4. The aqueous filler composition as claimed in claim 1, comprising a polyester resin which is built up from 1 to 6 mol-% of component (b) and 8 to 20 mol-% of component (d).

5. An aqueous filler composition of claim 1 wherein in the water-soluble resin, the amount of free hydroxyl groups is 100 to 250 mmol per 100 g.

6. An aqueous filler composition of claim 1 wherein the content of the free neutralized and neutralizable acid group is 9 to 120 meq of acid groups per 100 g.

7. An aqueous filler composition of claim 5 wherein in the water-soluble resin, the content of the free neutralizied and neutralizable acid groups is between 9 and 120 mmol of acid groups per 100 g.

* * * * *